(12) United States Patent
Samworth et al.

(10) Patent No.: US 6,426,625 B1
(45) Date of Patent: Jul. 30, 2002

(54) APPARATUS FOR LOGGING THE RESISTIVITY OF A GEOLOGICAL ROCK FORMATION

(75) Inventors: James Roger Samworth, Leics; Hemant Kumar Patel, Bramcote Moor, both of (GB)

(73) Assignee: Reeves Wireline Technologies, Ltd., Leicestershire (GB)

( * ) Notice: Subject to any disclaimer, the term of this patent is extended or adjusted under 35 U.S.C. 154(b) by 0 days.

(21) Appl. No.: 09/685,701

(22) Filed: Oct. 10, 2000

(30) Foreign Application Priority Data

Oct. 30, 1999 (GB) .............................................. 9925737

(51) Int. Cl.$^7$ ................................................ G01V 3/24
(52) U.S. Cl. ...................... 324/373; 324/371; 324/375
(58) Field of Search ................................. 324/347, 355, 324/366–375

(56) References Cited

U.S. PATENT DOCUMENTS

| | | | | | |
|---|---|---|---|---|---|
| 2,183,565 A | * | 12/1939 | Hawley | ................... | 324/355 X |
| 2,704,347 A | * | 3/1955 | Doll | ............................ | 324/347 |
| 2,880,389 A | * | 3/1959 | Ferre et al. | ............. | 324/373 X |
| 3,373,349 A | * | 3/1968 | Tanguy | ........................ | 324/373 |
| 3,390,323 A | * | 6/1968 | Kisling | ........................ | 324/375 |
| 3,772,589 A | | 11/1973 | Scholberg | | |
| 3,921,061 A | * | 11/1975 | Miller | .................... | 324/366 X |
| 4,484,139 A | | 11/1984 | Bravenec | | |
| 4,524,325 A | | 6/1985 | Moore et al. | | |

FOREIGN PATENT DOCUMENTS

EP  0 478 409 A1  9/1991

\* cited by examiner

Primary Examiner—Gerard R. Strecker
(74) Attorney, Agent, or Firm—Paul & Paul

(57) ABSTRACT

A small diameter tool for measurement of resistivity of geological rock formations, including a complex auxiliary electrode structure which is adjustable in electrode length between deep and shallow mode measurement operations.

4 Claims, 4 Drawing Sheets

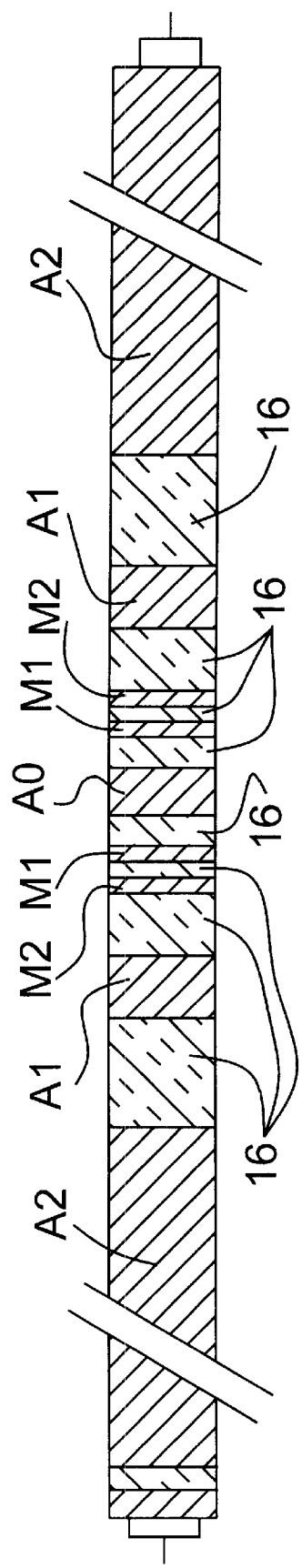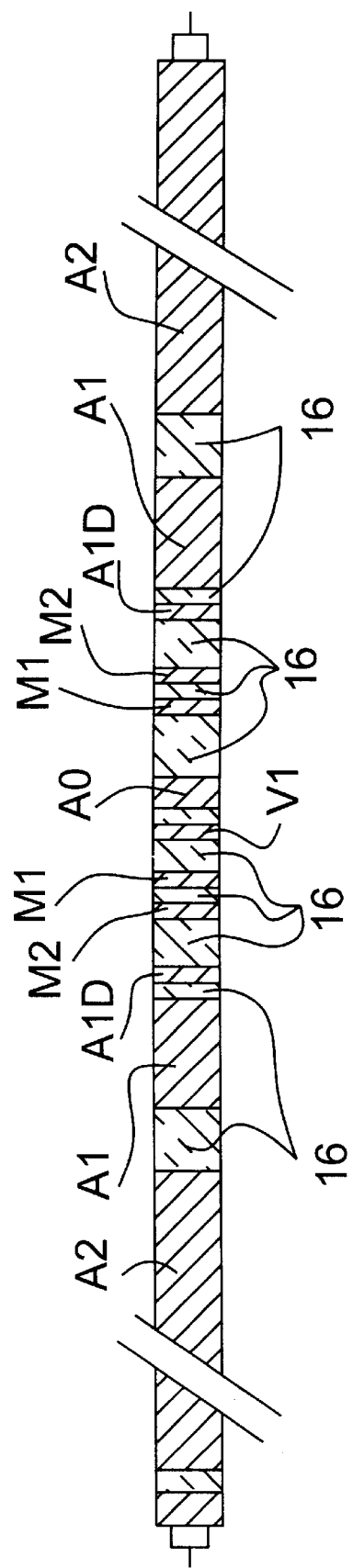

APPARATUS FOR LOGGING THE RESISTIVITY OF A GEOLOGICAL ROCK FORMATION

The present invention relates to borehole resistivity measurement apparatus for measurement of resistivity of subsurface geological rock formations and more particularly to such measurement using a relatively small diameter well logging tool.

As a background to the present invention it is known that in the process of drilling a well, the fluids used by the drilling process invade the sub surface geological rock formation for a radial distance around the well, displacing the fluids already there. The electrical resistivity of the fluids in the rock pores is the controlling influence on the measurement of the bulk formation resistivity. The resistivity of the drilling fluids is usually different to that of the original formation fluids giving rise to a "resistivity invasion profile" radiating outwards away from the well. It is necessary, when evaluating a formation for the presence of hydrocarbon, to know the undisturbed formation resistivity. Any measurement made by a logging tool in the borehole will be perturbed by the invasion and by the borehole itself. It is therefore usually necessary to make two or more measurements which have a different sensitivity to the "invaded zone" in order to be able to calculate the resistivity of the undisturbed formation. It is known to use a laterolog logging tool for this purpose.

The laterolog logging tool measures a series of electrical currents and potentials from which a resistance can be calculated. An array of electrodes confines measured currents into geometrically defined patterns. A knowledge of these patterns, and of the calculated resistances, enables resistivities to be determined. The electrode array is varied depending on the depth of the measurement required. It is also necessary to make the measurements with alternating current, or switched polarity direct current, to avoid polarisation effects arising from making measurements in an ionic fluid.

All the above is well known and described in U.S. Pat. No. 3,772,589.

The known apparatus and method is suitable for boreholes having a standard diameter and for logging tools having a relatively large diameter, eg 4 inches (10.0 cm). With such logging tools correction factors are employed using established correction charts which compensate for fluid present in the borehole between the logging tool and the edge of the borehole.

Such correction charts are, however, only applicable if the distance between the logging tool and the wall of the borehole is relatively short. As the distance grows then the compensation factor increases steeply and compensation becomes impracticable, thereby rendering any measurement unusable.

The present invention relates to relatively narrow diameter logging tools and to improvements in such tools to enable resistivity measurements to be obtained in standard diameter boreholes. Such measurements would not be possible using narrow diameter tools with standard resistivity measurement apparatus, as known from U.S. Pat. No. 3,772 589, because the compensation would be in the upper range of the steep correction curve where the measurement accuracy would not be reliable.

The present invention therefore has as its principal object to provide apparatus for measurement of the resistivity of a geological rock formation using a relatively narrow diameter logging tool.

The new tool is a small diameter, preferably 2¼ inches and has a novel array which is designed to deliver a similar performance to that provided by a large diameter tool. In order to achieve this, three fundamental criteria are required to be met.

Firstly, the level of correction required to correct for the presence of the borehole should be little or no greater than that of the larger conventional tools.

Secondly, the array has been developed such that the borehole correction for both measurements (the "Deep" and "Shallow") is similar, so that the two measurements "track" as the borehole conditions vary.

Thirdly, the array has also been designed to ensure that the "vertical resolution" i.e. the vertical distance over which the measurement is made, is the same for the two measurements.

The present invention therefore provides logging tool for logging the resistivity of a geological rock information, the logging tool comprising a plurality of electrodes forming part of a switchable circuit that generates currents that are measurable in a said formation for the purpose of determining the resistivity thereof, the plurality of electrodes including a pair of auxiliary electrodes, each said auxiliary electrode being separated into a first electrode portion and a second electrode portion and including switch means that are operable for repeatedly sequentially combining each said first and second electrode portions into a single energizable emitter electrode when said logging tool is used in a deep mode and separating said first and second electrode portions to enable only one of said first or second electrode portions to be energized as an emitter when said logging tool is used in a shallow mode, the operation of the switch means occurring sufficiently rapidly as to provide substantially simultaneous deep and shallow mode measurements.

The present invention also provides a method for operating a logging tool, including a plurality of electrodes forming part of a switchable circuit that generates currents that are measurable in a said formation for the purpose of determining the resistivity thereof, to log the resistivity of a geological rock formation, the method comprising the steps of surveying the formation in a first deep mode and then surveying the formation in a shallow mode and comprising the step of changing the length of an auxiliary electrode that is one of the said plurality of electrodes, when said survey in said shallow mode is conducted from the length of the auxiliary electrode when said deep mode survey is conducted, the said changing step occurring sufficiently rapidly as to provide substantially simultaneous deep and shallow mode measurements.

The present invention also provides a method for operating a logging tool to log the resistivity of a geological rock formation, comprising the steps of surveying the formation in a first deep mode and then surveying the formation in a shallow mode and comprising the step of changing the length of auxiliary electrode as defined when said survey in said shallow mode is conducted from the length of the auxiliary electrode when said deep mode survey is conducted.

BRIEF DESCRIPTION OF THE DRAWINGS

Embodiments of the present invention will now be described with reference to the accompanying drawings in which:

FIG. 1 shows a known dual laterolog array in longitudinal cross section, illustrating the various electrodes.

FIG. 2 shows a compact laterolog array according to the present invention also in longitudinal cross section.

DETAILED DESCRIPTION OF THE PREFERRED EMBODIMENTS

With reference now to FIG. 1, the known array comprises a plurality of electrodes mounted in known manner in al logging tool.

The operation of the electrodes will be further explained with reference to FIGS. 3 and 4.

The known electrode array shown in FIG. 1 comprises a generally symmetrical array, having a plurality 1 of metal electrodes separated by insulators 16. The electrodes when energised emit currents into the geological rock formation when the logging tool 10 is lowered down a borehole 18.

In the array a central electrode A0 is positioned with two electrodes M1 on each side, followed by two electrodes M2, two electrodes A1 and two large electrodes A2.

In the arrangement of FIG. 2 according to the present invention the electrodes A1 are complex, being separated into two electrodes A1 and A1D, but in other respects the arrangement is similar.

FIGS. 1 and 2 show exemplary but non-limiting electrode dimensions and spacings.

Figure 3:
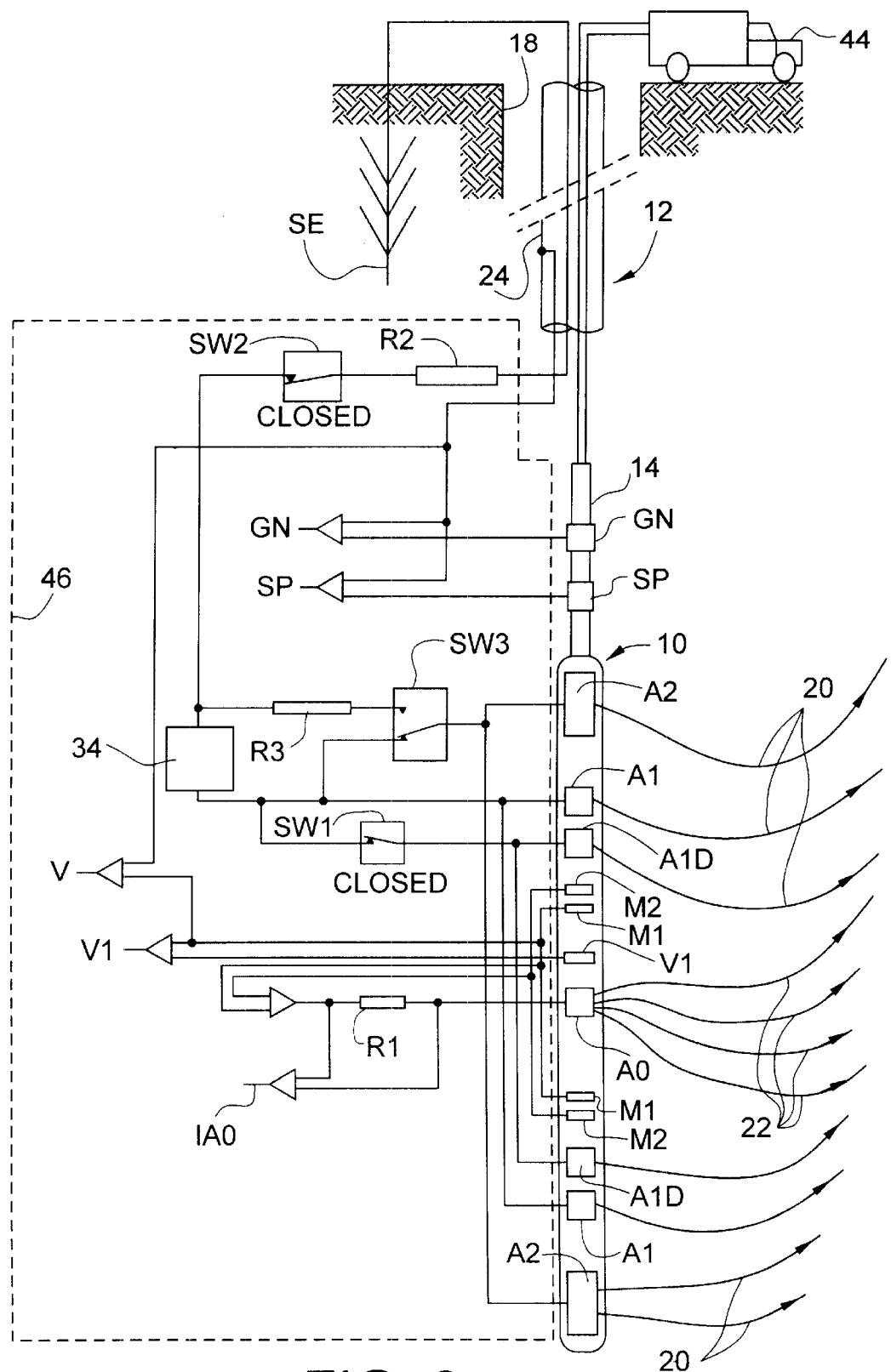
FIG. 3 illustrates the operation of the array of FIG. 2 in deep mode.

With reference to FIG. 3 an outline of the deep mode operation is as follows:

A current 20 is sent out from the electrodes A1D, A1 and A2, which in this mode are connected together via closed switch SW1. This current flows through the formation to the surface electrode SE and returns to the logging tool 10 via the logging cable 12.

A "measurement current" 22 is sent out from the electrode A0 and returns the same way. The level of this measurement current, which is measured at IA0, is controlled in such a way that the potential difference V2 between the monitor electrodes M1 and M2 is maintained at zero. In this way the measurement current is confined to a known geometric pattern as described earlier and as illustrated. A primary voltage measurement V is made by measuring the potential difference between the M1 electrode and a remote position, usually the conducting outer armour 24 of the logging cable 12. This voltage when combined with the current 22 from A0 is used to calculate the deep resistance and resistivity. A secondary voltage is measured by substituting an electrode (GN) on the insulated part 14 of the logging cable (the "bridle") for the cable armour 24. The primary and secondary voltages are measured simultaneously. Comparison of the two measurements can given an indication of anomalous resistivity distributions, producing an effect well known as the "Groningen effect".

The electrodes A1+A1D are known as auxiliary electrodes, and in the prior art are a single item disposed on each side of A0. In the apparatus according to the present invention they are split to enable a different length to be used in the Deep and Shallow modes.

Figure 4:
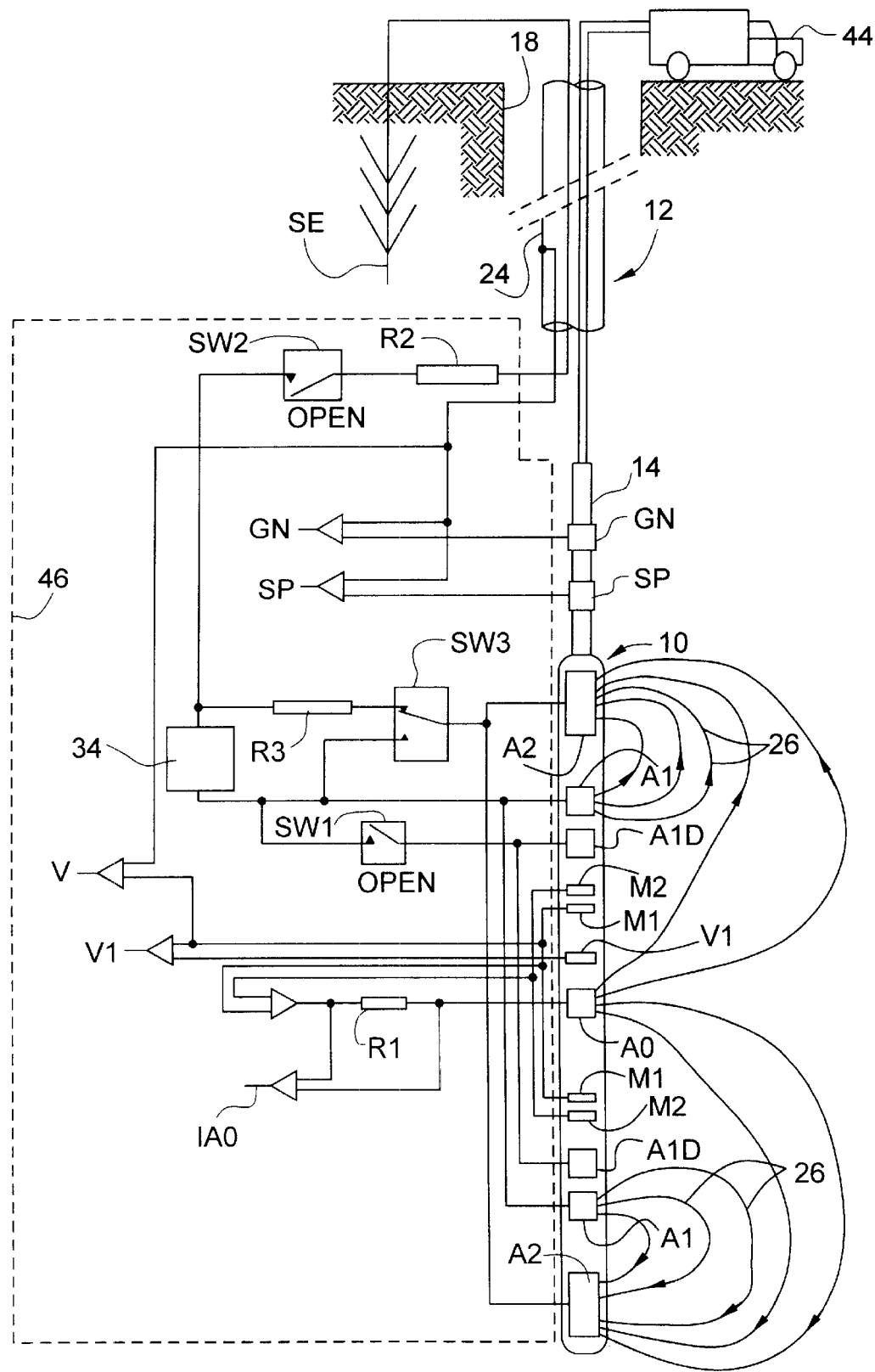
FIG. 4 illustrates the operation of the array of FIG. 2 in shallow mode.

With reference to FIG. 4, in the shallow mode, current 26 is sent from the A1 electrodes and now returned to the A2 electrodes, instead of the surface, the A1D electrodes being disconnected in the present invention to reduce the length of the auxiliary electrode, thereby providing compensation for the use of a narrow diameter logging tool. The current pattern now flares out and penetrates less distance into the formation. In this case, only a primary voltage measurement is made.

The invention relates to the switching of the auxiliary electrode lengths between the two modes, giving extra design freedom to enable the three criteria described above to be met with a small diameter tool.

In both modes, the measurement current from the relatively small A0 electrode flares out in the borehole in the immediate proximity of the tool before assuming a path that is approximately normal to the tool. Knowledge of the electrical potential in this region, when combined with the measured current from A0, gives a measurement of the borehole mud resistivity which can then be used to better correct the measurements for the perturbing effects of the borehole. This voltage is sensed by the V1 electrode, situated as shown in the diagrams.

A sequence of measurements is initiated by a command to the tool by the surface computer, usually repeated at a regular depth interval as the tool is drawn along the well bore.

The deep mode is set and the drive 28 initially sets all the electrodes to zero potential to allow the electrode surfaces to electrochemically stabilise.

Figure 5:
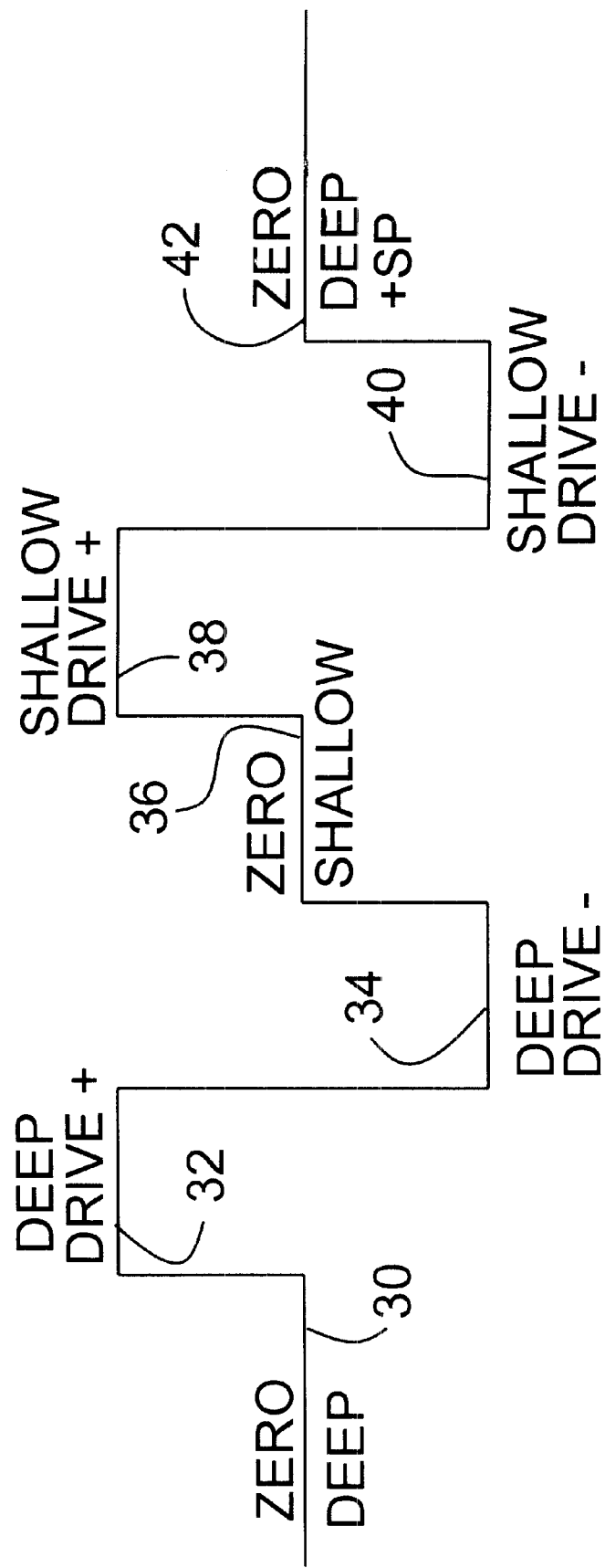
FIG. 5 illustrates the wave form outputted by the driver of the electrode array.

The drive 28 then switches positive and then negative, see FIG. 5 at 32 and 34, for similar periods. A series of measurements is then made in the latter half of each period after the electrodes have again stabilised. An average deep measurement is then calculated. This cancels out effects that may arise from electrode polarisation.

The shallow mode is then set and a similar sequence undertaken for the shallow measurement, see FIG. 5 at 36, 38, and 40.

After this period, during period 42 in FIG. 5, all the electrodes, with the exception of the surface one are zeroed, during which a measurement of the well's Spontaneous Potential is made by measuring the potential difference between the SP electrode and the surface electrode. All the above is repeated at the next depth increment.

Each period of the measurement cycle has a duration of typically 40 milliseconds which is slow enough to avoid problems due to electrical skin effects.

As illustrated, a logging vehicle 44 may be used in deploying the apparatus for the present invention. Referring to FIGS. 3 and 4, R1, R2, and R3 designate resistances and SW1, SW2, and SW3 designate switches in the apparatus electronics 46.

In summary, although the tool has many unique features, the novel enabling feature allowing such a slim tool to perform with good quality is the splitting of the auxiliary electrodes, and using different lengths for each mode of operation.

What is claimed is:

1. A logging tool for logging the resistivity of a geological rock formation, the logging tool comprising a plurality of electrodes forming part of a switchable circuit that generates currents that are measurable in a said formation for the purpose of determining the resistivity thereof, the plurality of electrodes including a part of auxiliary electrodes, each said auxiliary electrode being separated into a first electrode portion and a second electrode portion and including switch means that are operable for repeatedly sequentially combining each said first and second electrode portions into a single, energizable emitter electrode when said logging tool is used in a deep mode and separating said first and second electrode portions to enable only one of said first or second electrodes portions to be energized as an emitter when said logging tool is used in a shallow mode, the operation of the switch means occurring sufficiently rapidly as to provide substantially simultaneous deep and shallow mode measurements.

2. A logging tool for logging the resistivity of a geological rock formation as claimed in claim 1, in which said first electrode portion is substantially larger than said second electrode portion.

3. A method for operating a logging tool, including a plurality of electrodes forming part of a switchable circuit that generates currents that are measurable in a said formation for the purpose of determining the resistivity thereof, to log the resistivity of a geological rock formation, the method comprising the steps of surveying the formation in a first deep mode and then surveying the formation in a shallow mode and comprising the step of changing the length of an auxiliary electrode that is one of the said plurality of electrodes, when said survey in said shallow mode is conducted, from the length of the auxiliary electrode when said deep mode survey is conducted, the said changing step occurring sufficiently rapidly as to provide substantially simultaneous deep and shallow mode measurements.

4. A method for operating a logging took as claimed in claim 3, in which the auxiliary electrode is made shorter when said shallow mode step is performed.

\* \* \* \* \*

UNITED STATES PATENT AND TRADEMARK OFFICE
CERTIFICATE OF CORRECTION

PATENT NO. : 6,426,625 B1  
DATED : July 30, 2002  
INVENTOR(S) : James Roger Samworth et al.

Page 1 of 1

It is certified that error appears in the above-identified patent and that said Letters Patent is hereby corrected as shown below:

Drawings,
FIG. 3, change reference numeral "34" to -- 28 --.
FIG. 4, change reference numeral "34" to -- 28 --.

Column 2,
Before line 35, insert the following paragraph:
-- Preferably said first electrode portion is substantially larger than said second electrode portion. --
Delete the paragraph beginning on line 50 and ending on line 58.

Column 3,
Line 2, delete "and".
Line 4, replace "mode." with -- mode; and --.
Line 5, replace "driver" with -- drive --.
Line 12, replace "manner in al" with -- manner in a --.
Line 17, replace "plurality 1 of" with -- plurality of --.
Line 30, insert the following paragraph:
   -- The arrangement is operated in two modes, a deep mode and a shallow mode. --.
Line 54, replace "given" with -- give --.

Column 4,
Line 23, between "potential" and "to allow" insert -- , see FIG. 5 at 30, --.
Line 59, replace "part" with -- pair --.

Column 6,
Line 9, replace "logging took" with -- logging tool --.

Signed and Sealed this

Fourth Day of May, 2004

JON W. DUDAS
*Acting Director of the United States Patent and Trademark Office*